US009256786B2

(12) United States Patent
Buehler et al.

(10) Patent No.: US 9,256,786 B2
(45) Date of Patent: Feb. 9, 2016

(54) METHOD OF IDENTIFICATION FROM A SPATIAL AND SPECTRAL OBJECT MODEL

(71) Applicant: GE Aviation Systems LLC, Grand Rapids, MI (US)

(72) Inventors: Eric Daniel Buehler, Grand Rapids, MI (US); Benjamin Thomas Occhipinti, Grand Rapids, MI (US); Konrad Robert Kuczynski, Grand Rapids, MI (US); Thomas Baby Sebastian, Chatham, NJ (US); Stefano Angelo Mario Lassini, Lowell, MI (US); Ana Isabel Del Amo, Grand Rapids, MI (US); Richard Shawn Kelly, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/054,742

(22) Filed: Oct. 15, 2013

(65) Prior Publication Data

US 2015/0103341 A1    Apr. 16, 2015

(51) Int. Cl.
*G01J 3/40* (2006.01)
*G06K 9/00* (2006.01)
*G01J 3/42* (2006.01)
*G01J 3/28* (2006.01)
*G01J 3/02* (2006.01)

(52) U.S. Cl.
CPC .............. *G06K 9/0063* (2013.01); *G01J 3/02* (2013.01); *G01J 3/28* (2013.01); *G01J 3/40* (2013.01); *G01J 3/42* (2013.01); *G06K 2009/00644* (2013.01)

(58) Field of Classification Search
CPC .................. G01J 3/28; G01J 3/40; G01J 3/02; G01J 3/42; G01J 3/08
USPC ................................................ 356/300–334
See application file for complete search history.

(56) References Cited

U.S. PATENT DOCUMENTS

| 6,075,891 | A  | 6/2000  | Burman         |
|-----------|----|---------|----------------|
| 6,296,189 | B1 | 10/2001 | Lawandy et al. |
| 6,353,675 | B1 | 3/2002  | Sharma         |
| 6,488,155 | B2 | 12/2002 | Lawandy et al. |

(Continued)

FOREIGN PATENT DOCUMENTS

| EP | 2698740 A2 | 2/2014  |
|----|------------|---------|
| EP | 2793191 A2 | 10/2014 |

(Continued)

OTHER PUBLICATIONS

GE Combined Search and Examination Report Issued on Mar. 27, 2015 in relation to corresponding GB application 1417796.8.
Unofficial English Translation of Japanese Office Action issued in connection with corresponding JP Application No. 2014207651 on Sep. 8, 2015.

*Primary Examiner* — Abdullahi Nur
(74) *Attorney, Agent, or Firm* — GE Global Patent Operation; William S. Munnerlyn (57) ABSTRACT

A method of referencing an imaged object includes, among other things, obtaining a series of images, observing key characteristics of the object in each of the series of images, associating the observed key characteristics with the object; and assigning a unique identifier to the object based upon the associated key characteristics. The series of images includes spectral and spatial imagery. Some of the key characteristics are in the spectral imagery and some of the key characteristics are in the spatial imagery.

8 Claims, 5 Drawing Sheets

(56) References Cited

U.S. PATENT DOCUMENTS

| | | |
|---|---|---|
| 2009/0087033 A1* | 4/2009 | Chao et al. ............. 382/110 |
| 2009/0182690 A1* | 7/2009 | Stein ..................... 706/12 |
| 2010/0322480 A1 | 12/2010 | Banerjee et al. |
| 2012/0019536 A1* | 1/2012 | Arab ..................... 345/440 |
| 2013/0034266 A1* | 2/2013 | Shamir et al. .......... 382/103 |

FOREIGN PATENT DOCUMENTS

| | | |
|---|---|---|
| GB | 2516142 A | 1/2015 |
| JP | 2012088876 A | 5/2012 |

* cited by examiner

METHOD OF IDENTIFICATION FROM A SPATIAL AND SPECTRAL OBJECT MODEL

BACKGROUND OF THE INVENTION

Hyperspectral cameras are capable of capturing hyperspectral image frames, or datacubes at video frame rates. These cameras acquire high spatial and spectral resolution imagery. In combination with techniques relating to computer vision and spectral analysis, operators of hyperspectral cameras have engaged in surveillance applications relating to detection, tracking and identification of imaged objects.

BRIEF DESCRIPTION OF THE INVENTION

One aspect of the invention relates to a method of referencing an imaged object. The method includes: obtaining a series of images wherein at least some of the images are spectral and some of the images are spatial; observing key characteristics of the object in each of the series of images wherein some of the key characteristics are in the spectral images and some of the key characteristics are in the spatial images; associating the observed key characteristics with the object; and assigning a unique identifier to the object based upon the associated key characteristics.

Another aspect of the invention relates to a system for referencing an imaged object. The system includes: at least one imaging device configured to record a series of spectral and spatial images of an object; a processor configured to process the spectral and spatial images, and software in the processor. The software includes instructions to: observe key characteristics of the object in each of the series of images wherein some of the key characteristics are in the spectral images and some of the key characteristics are in the spatial images; associate the observed key characteristics with the object; and assign a unique identifier to the object based upon the associated key characteristics.

DESCRIPTION OF EMBODIMENTS OF THE INVENTION

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include increasing the utility and performance of remote imaging systems for object detection, tracking and identification. An imaging and tracking system that parses spatial and spectral imagery to a form a unique identifier that references and describes an observed object is robust to changes in factors associated with the image collection process. Because the unique identifier is based upon the intrinsic characteristics of the object that are independent of the characteristics of the imaging system, the tracking system can correlate separate observances of an object when historical information about the object life is initially unknown. In other words, the system may observe a previously unknown object, assign a unique identifier according to the method of the present invention and then observe the object at a later time and correctly associate the observations. Additionally, the method of the present invention enables remote observation and searching of objects without requiring multiple source confirmation to verify the object's identity.

Figure 1:
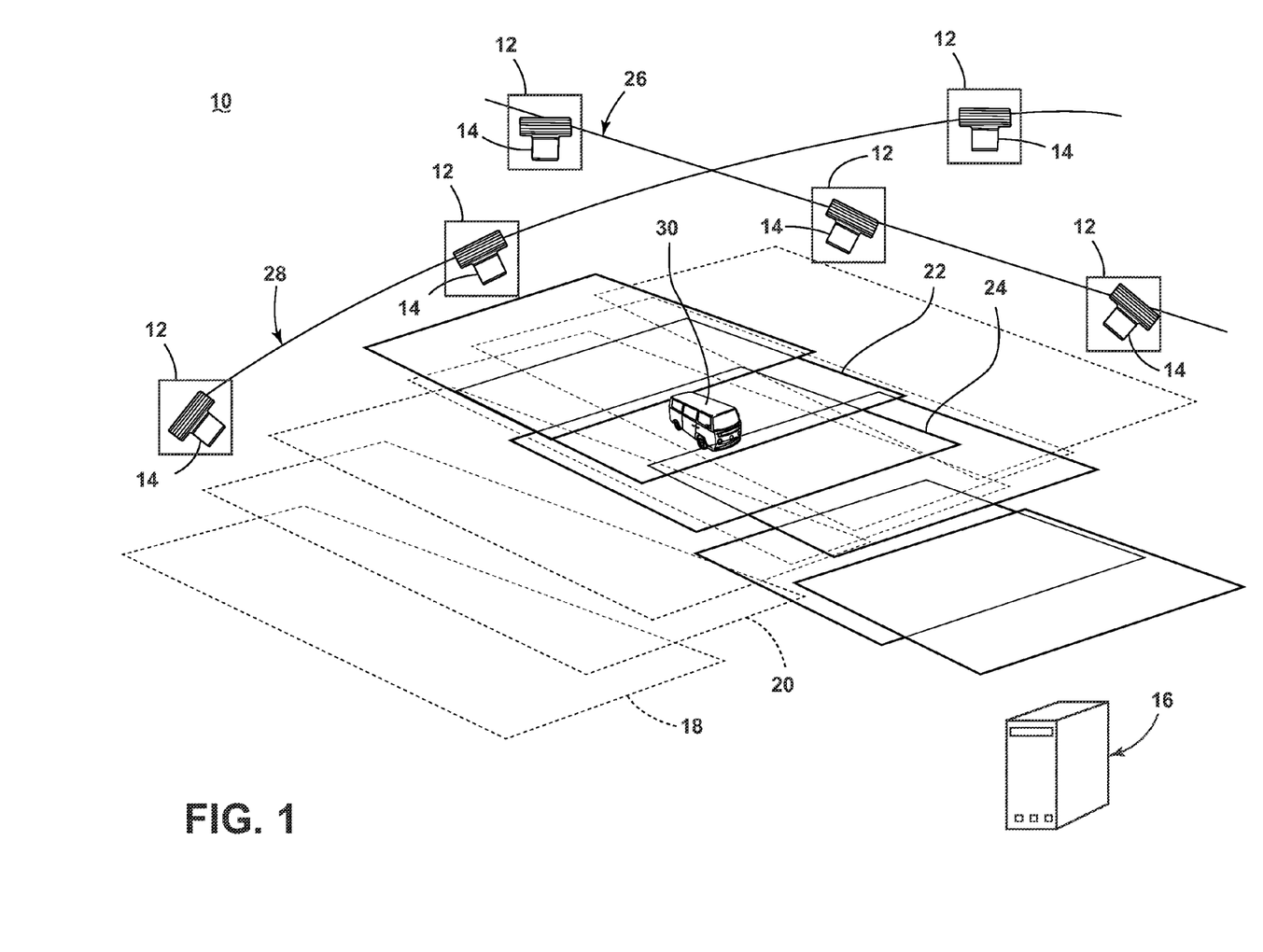
FIG. 1 shows a scenario where a system according to an embodiment of the present invention includes two exemplary moving platforms that capture imagery of a vehicle.

Referring now to FIG. 1, a system 10 for the formation of a single unifying identifier for referencing an object 30 includes at least one imaging device 14 configured to record a series of spectral and spatial images of the object 30. A processor 16 is configured to process the spectral and spatial images of the object 30, and software in the processor 16 includes instructions to observe and associate key characteristics of the object 30 in each of the series of images. A processor onboard the platform may perform a processing of the series of images or may instruct transmittal of the series of images to a remote location for processing by a second processor or processing system (collectively termed "a processor" 16 and shown as a geographically remote unit from the imaging device 14 in FIG. 1). Based upon the association of key characteristics of the object 30, the processor 16 may assign a unique identifier to the object 30.

The imaging device 14 may include one or more cameras capable of capturing and recording image data at specific wavelengths across the electromagnetic spectrum. Imaging devices for use in the present invention may capture imagery in wavelengths defined by the infrared, visible and ultraviolet bands. Additionally, the imaging device 14 may be configured to collect imagery such that the operable bands of the camera are combined to form a panchromatic image or divided to form a multispectral or hyperspectral datacube. In the case of a panchromatic imager, the imaging device 14 may form a series of panchromatic images where each image is a record of the total intensity of radiation falling onto each pixel of the image. The relationship between the pixels and their relative intensities form the spatial content (or spatial imagery) of the collected series of images.

Alternatively, the imaging device 14 may form a series of images where each image includes data corresponding to bands of specific wavelengths. For example, a general purpose camera may form three representations of an image in the visible spectrum; one responsive to wavelengths associated with the color green, another for red and a third for blue. Additional bands may be provided to form images outside of the so-called visible spectrum. Spectral imagers with more numerous bands, finer spectral resolution or wider spectral coverage range may be called multispectral, hyperspectral or ultraspectral depending upon the particular number and relative wavelengths of the imaged spectral bands. In this way, each pixel includes a spectral signature, or vector of intensities that relate the spectral content (or spectral imagery) for the collected series of images. While many imaging devices 14 are contemplated for collecting spatial and spectral imagery, in one preferred implementation, the imaging device 14 includes a staring array hyperspectral video camera. However, other known hyperspectral imaging devices may include a combination staring array color/panchromatic camera with a fast scanning spectral camera.

Figure 2:
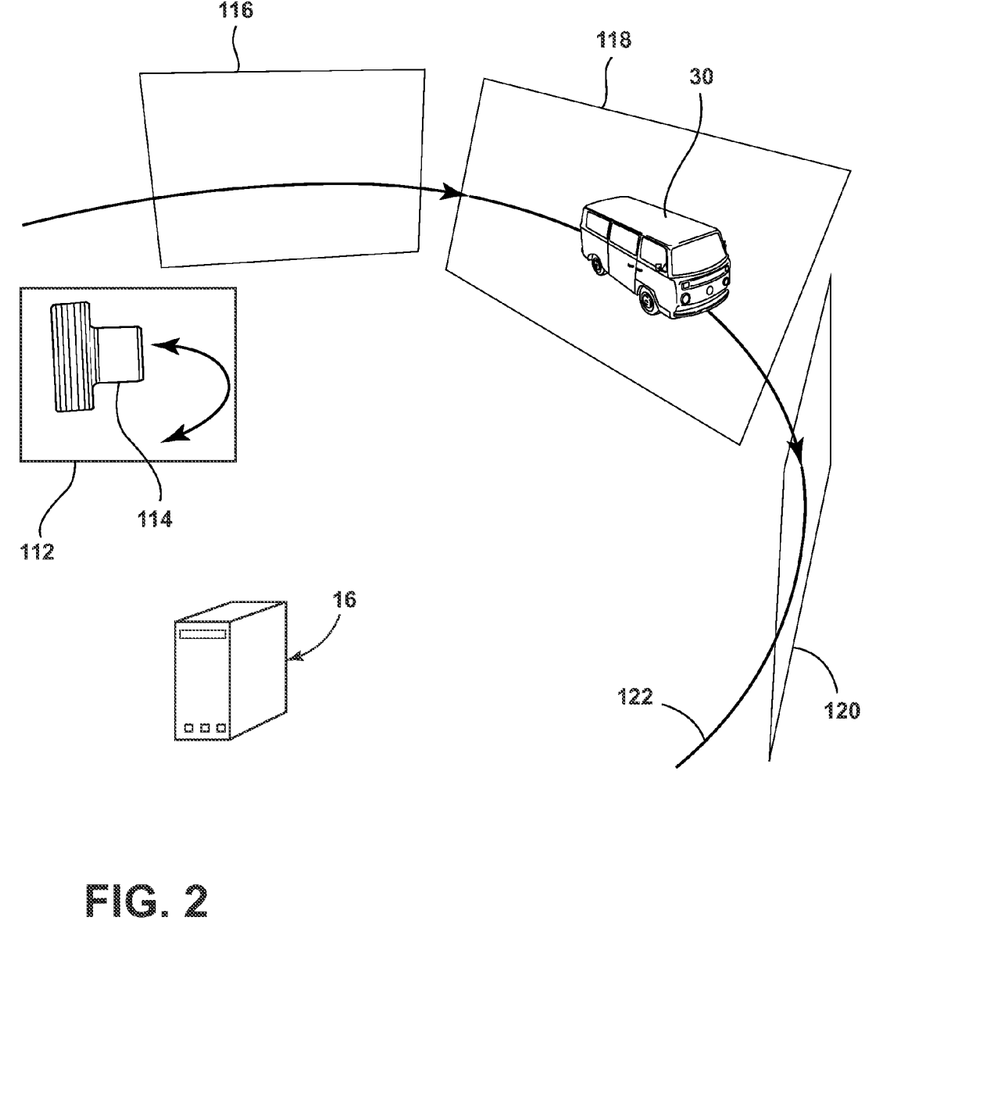
FIG. 2 shows a scenario where a system according to an embodiment of the present invention includes an exemplary platform that captures imagery of a moving vehicle.

The imaging device 14 may, for example, be stationary on a mobile platform 12 or movable on a stationary platform 112 (as shown in FIG. 2), or any combination thereof. On a movable platform 12, as shown for example in FIG. 1, the imaging device 14 may image an object of interest 30 where the footprint of the imaged area 18, 20, 22, 24 moves, in part, as a consequence of the movement of the platform 12. The movement of the platform may be an arc 28 traversed by the imaging device 14, a line 26 traversed by imaging device 14, or any motion dictated by the operability of the platform 12.

On a stationary platform 112, as shown for example in FIG. 2, the imaging device 114 may move by rotation in a single axis on the platform 112 to track and image an object of interest 30. In this case, the imaged footprint 116, 118, 120 follows an arc 122 to image the object of interest 30. In most cases, the object of interest 30 would not follow the same arc 122 of the footprint, in which case the perspective of the footprint will change. As well, the object of interest 30 may be stationary or mobile.

It will be apparent that relative motion between the imaging device 14 or 114 and the imaged object of interest 30 will change the perspective between the imaging device 14 or 114 and the object of interest 30. Consequently, the observed spectral reflectance of the object of interest 30 will vary, at least in part, as a function of the changing relative perspective.

Figure 3:
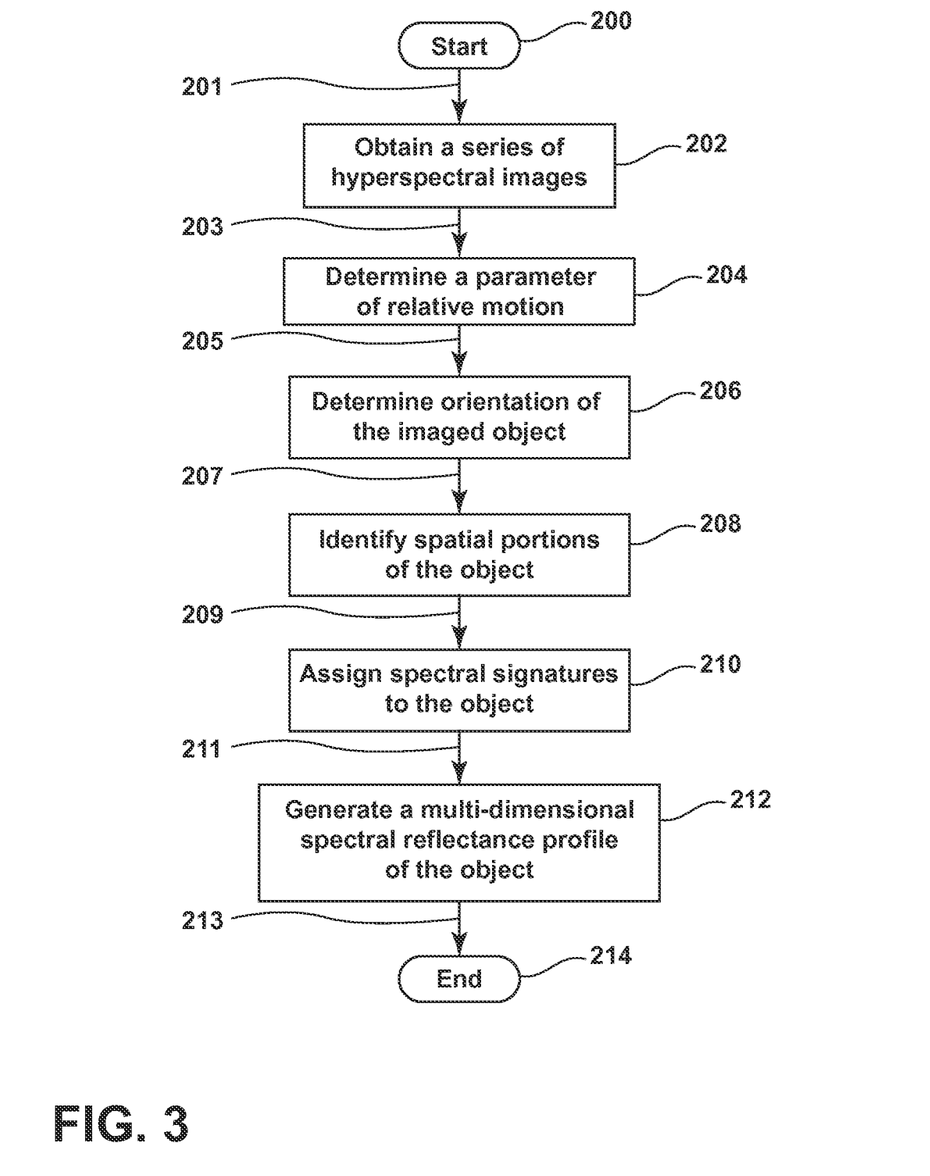
FIG. 3 is a flowchart showing a method of generating a spatial and spectral object model from imagery captured by a system like that described in FIG. 1.

FIG. 3 is a flowchart showing a method of generating a spatial and spectral object model using the system described above in FIGS. 1 and 2. Initially at step 200, an imaging device 14 may acquire and track an object of interest 30 by capturing imagery that is both spatially and spectrally resolved. Herein referred to as "hyperspectral images" to indicate the presence of both spatial and spectral content or images, the actual imagery may be collected with imaging devices as described above and may include elements responsive to multiple ultraviolet, infrared and/or visible wavelengths.

At step 202, an imaging device 14 may obtain a series of hyperspectral images 203. To determine alignment among the hyperspectral images 203 in the series, the processor 16 may employ image stability techniques to shift the series of hyperspectral images 203 from frame-to-frame to counteract motion and jitter that may have been introduced, for example, by movement of the platform 12. The series of hyperspectral images 203 of the object 30 may have a relative motion between the object of interest 30 and the imaging device 14.

At step 204, the processor 16 may determine at least one parameter 205 of relative motion between the object of interest 30 and the imaging device 14. For example, the processor 16 may use data from an onboard sensor positioning system that measures relative and absolute positioning. Example onboard systems may include relative positioning systems like inertial navigation systems in combination with absolute positioning systems like GPS. Along with the onboard positioning data, the processor 16 may ascertain differences in the series of hyperspectral images 203 to infer motion of the object of interest 30 and estimate a range from the imaging device 14 to the object of interest 30. The processor 16 may determine relative motion as rotational (i.e. roll, pitch, yaw) and translational (i.e. x, y, z) changes between the imaging device 14 and the object of interest 30. The processor 16 may parameterize the relative motion with Euler angles and direction vectors. Other parameterizations of the relative motion between the imaging device 14 and the object of interest 30 may apply depending upon the implementation. The processor 16 may map the parameter 205 of the relative motion between the object 30 and the imaging device 14 to determine an orientation 207 of the object 30 in each hyperspectral image in the series at step 206.

Upon determination of an orientation 207 of the object of interest 30 in each of the series of hyperspectral images 203, the processor 16 at step 208 may identify spatial portions 209 of the object of interest 30 in each of the series of hyperspectral images 203. Then, at step 210, the processor 16 may assign a spectral signature 211 to each spatial portion 209 of the object of interest 30 in each of the series of hyperspectral images 203. Based on the assignment of a spectral signature 211 to a spatial portion 209 of the object of interest 30, the processor 16 may generate, at step 212, a multi-dimensional spectral reflectance profile 213. The dimensionality of the spectral reflectance profile 213 is determined by the orientation 207 of the object 30, the spatial portions 209, and the spectral signatures 211 associated with the spatial portions 209. Therefore, the multi-dimensional spectral reflectance profile 213 may describe both the spectral reflectance signatures 211 of an object of interest 30 and the spatial relationships among the spectral reflectance signatures 211 along with a spatial, or geometrical, description of the object 30.

Once the multi-dimensional spectral reflectance profile 213 is generated, the processor 16 may classify the object of interest 30 in the series of hyperspectral images 203. The multi-dimensional spectral reflectance profile 213 encodes a description of the spatial dimensions and spectral textures of the object of interest 30. The processor 16 may implement additional processing techniques as described below to determine the size and shape, along with texture characteristics, of the spatial portions 209 of the object of interest 30.

Upon completion of the method at step 214, the imaging device 14 may reacquire the object of interest 30 in successive series of hyperspectral images 203. The processor 16 may improve the multi-dimensional spectral reflectance profile 213 of the object based upon the successive collections of hyperspectral imagery. While initial passes may result in unobserved orientations of the object, successive passes may begin to fill in the model of the multi-dimensional spectral reflectance profile 213 for the previously unobserved orientations.

Conversely, the processor 16 may improve the multi-dimensional spectral reflectance profile 213 for previously observed orientations. When the processor 16 reacquires an object at a previously observed orientation, the processor 16 may update a previously generated multi-dimensional spectral reflectance profile 113 by weighting the spectral signature 111 based upon the integration time of the hyperspectral image. For example, if a given spatial portion 209 for a given orientation 207 has been previously observed for 0.1 seconds to determine a spectral signature 211 and then an additional measurement is made for 0.2 seconds, the spectral signature 211 for the spatial portion 209 for the orientation 207 in the multi-dimensional spectral reflectance profile 213 may be adjusted to weight the new measurement twice as heavily as the old measurement.

Figure 4:
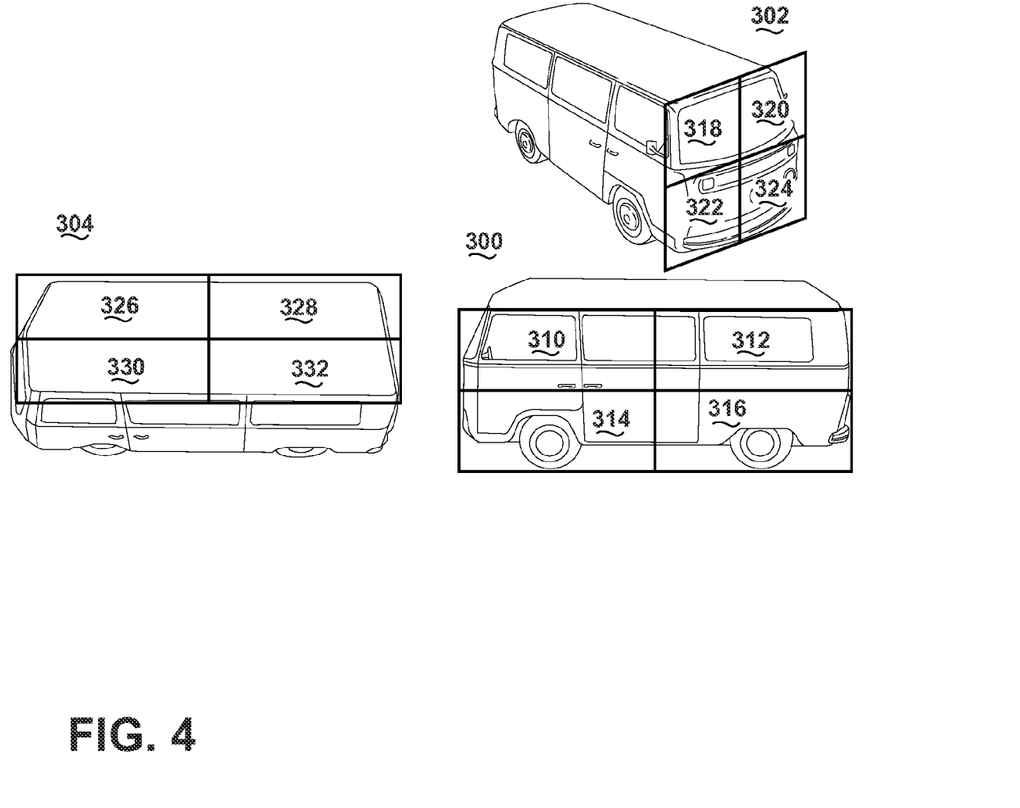
FIG. 4 demonstrates the spatial portioning of an imaged vehicle used to generate a spatial and spectral object model.

To illustrate, FIG. 4 demonstrates the spatial portioning of an imaged vehicle for three different orientations 300, 302, 304. For a first imaged side of the vehicle at orientation 300, the processor 16 identifies four spatial portions 310, 312, 314, 316. For a second imaged side of the vehicle at orientation 302, the processor 16 identifies four spatial portions 318, 320, 322, 324. For a third imaged side of the vehicle at orientation 304, the processor 16 identifies four spatial portions 326, 328, 330, 332. The processor 16 then assigns a spectral signature based on the hyperspectral imagery to each of the spatial portions. In this example, there will be four distinct spectral signatures for each of the three imaged orientations for a total of 12 distinct spectral signatures. Therefore, with respect to the method outlined in FIG. 3, the illustration of FIG. 4 demonstrates a multi-dimensional spectral reflectance profile 213 that includes three orientations, each with four spatial portions 209 and each spatial portion includes one corresponding spectral reflectance signature 211.

The processor 16 may further analyze the spatial and spectral imagery to identify uniquely the object of interest. That is, the processor 16 may analyze a spatial/spectral characterization (such as the multi-dimensional spectral reflectance profile described above) to derive and associate key characteristics of the object 30 with a goal of identifying the individual instance of the object being imaged. In this way, beyond merely recognizing the type of object, the processor 16 may fingerprint the particular object.

Figure 5:
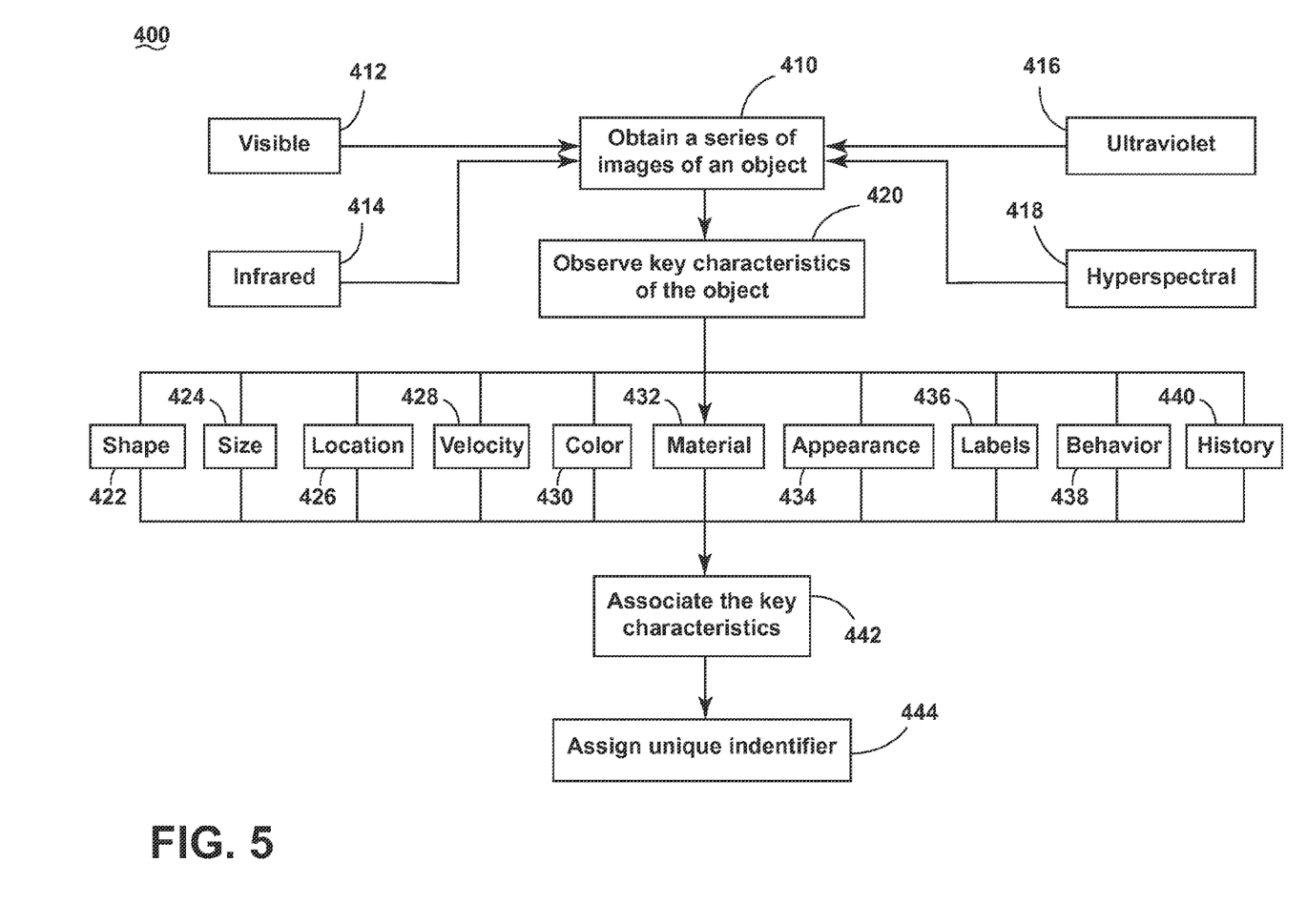
FIG. 5 is a flowchart showing a method of identification from a spatial and spectral object model.

FIG. 5 is a flowchart showing a method of identification from a spatial and spectral object model. Initially, the processor 16 obtains a series of images of an object. As described above, the series of images may provide spectral and spatial content and may come from one or more imaging devices configured to capture one or more types of imagery. Each imaging device may provide spectral images, spatial images or a combination of both spectral and spatial images. Delineated by the wavelength of the captured imagery, imaging devices that may provide the imagery include visible 412, infrared 414, ultraviolet 416 and hyperspectral 418.

The processor 16 may then observe key characteristics of the object 30 in the series of images. The processor 16 may derive key characteristics from the spatial imagery using conventional image processing techniques known in the field of computer vision. Typical techniques relate to concepts of feature extraction, detection, image segmentation, parameter estimation, image registration and recognition.

Additionally or in tandem with the spatial analysis, the processor 16 may derive key characteristics from the spectral imagery using techniques known for the analysis of spectral imagery. Spectral-based processing algorithms have been developed to classify or group similar pixels; that is, pixels with similar spectral characteristics or signatures. A number of hyperspectral search algorithms have been developed and used in the processing of hyperspectral imagery for the purpose of target detection. These hyperspectral search algorithms are typically designed to exploit statistical characteristics of candidate targets in the imagery and are typically built upon well-known statistical concepts. For example, Mahalanobis distance is a statistical measure of similarity that has been applied to hyperspectral pixel signatures. Mahalanobis distance measures a signature's similarity by testing the signature against an average and standard deviation of a known class of signatures.

Other known techniques include Spectral Angle Mapping (SAM), Spectral Information Divergence (SID), Zero Mean Differential Area (ZMDA) and Bhattacharyya Distance. SAM is a method for comparing a spectral signature to a known signature by treating each spectra as vectors and calculating the angle between the vectors. Because SAM uses only the vector direction and not the vector length, the method is insensitive to variation in illumination. SID is a method for comparing a spectral signature to a known signature by measuring the probabilistic discrepancy or divergence between the spectra. ZMDA normalizes the signatures by their variance and computes their difference, which corresponds to the area between the two vectors. Bhattacharyya Distance is similar to Mahalanobis Distance but is used to measure the distance between a set of spectral signatures against a known class of signatures.

By establishing a framework where spatial and spectral processing techniques may be integrated, the processor 16 may observe key characteristics of the object at step 420. Key object characteristics may include spatially based attributes such as object shape 422, object size 424, object location 426, and object velocity 428. Key object characteristics that incorporate spectral attributes may include object color 430, object material composition 432 and texture. These characteristics may provide the type of information typically used in a classification process. For example, the combination of these characteristics may indicate the type of vehicle observed by the imaging system.

The processor 16 may infer other key characteristics with additional processing including object appearance 434, identifying object labels 436, object behavior 438 and object history 440. The object appearance 434 includes the nuanced and potentially unique aspects of the surface of the object. For example, a dent on a car or an additional antenna mounted to the roof of a vehicle may provide a specific identifying feature that the processor 16 may observe and detect with spatial and spectral processing techniques.

Identifying object labels 436 may provide an anthropogenic identifier analogous to the object appearance and may include license plates, bumper stickers, tail markings, etc. The processor 16 may include, for example, algorithms for optical character recognition to further discriminate object labels. The processor 16 may observe object behavior 438 and detect and quantify aspects of the object associated with the limitations of the object such as a car's turning radius or anthropogenic attributes such as the level of adherence to traffic laws.

The processor 16 may also infer an object's history 440 by correlating multiple observations of an object across time. The time scale that the processor 16 may have to correlate across, that is the duration of temporal discontinuity, may range from a few seconds such as when an observed object is temporarily obscured to a time scale on the order of days when an object such as a vehicle that infrequently routes through a viewing footprint of the remote imaging device. Therefore, the object's history may establish patterns in location, behavior over time and changes in physical appearance.

By associating key characteristics 442, the processor 16 may differentiate an object from other types of objects when key characteristics such as an object's shape 422, size 424, location 426, velocity 428 and color 430 are used to isolate the object of interest. Object isolation and differentiation across a temporal discontinuity may require identification of other key characteristics such as material composition 432, object appearance 434, identifying labels 438 above to establish the object's identity.

To facilitate the referencing of objects of interest for archival and retrieval, the processor 16 may assign a single unique identifier 444 to reference the object through its life cycle as observed by the remote imaging system. The unique identifier 444 may encode key characteristics associated with the object; that is, the visual, spectral and behavioral characteristics along with the historical characteristics as described above.

A system may manage a single or multiple identifiers simultaneously depending upon the objects in the current view of the system. Key characteristics may be aggregated together to create a new identifier to describe an object observed by multiple systems. Due in part to the uniqueness of the identifier (and its one-to-one mapping to the object it references), the identifier may provide an index to key characteristics of the object observed by the remote imaging system. A computing system (embodied above as processor 16) may automatically generate the identifier or an operator of the computing system may manually generate the identifier. Subsequent to the creation of the identifier, the identifier may provide a reference to the object for adding new key characteristics or retrieving known characteristics of the related object.

With the advent of video hyperspectral sensors, one system may gather sufficient information to identify uniquely the observed objects. Multiple systems may act independently where each system may gather sufficient information to uniquely identify the observed objects. In the multiple system modality, information may then be shared among the systems to aggregate key characteristics. In this way, key characteristics observable by one system may combine with different key characteristics observed by a second system to enhance the overall identifier for the object.

A single unifying identifier for an object of interest that incorporates many of the observable and inferred characteristics of the object may facilitate key operations fundamental to remote imaging systems. For example, when using multiple remote imaging systems, the unique identifier may facilitate an object handoff between systems by allowing for the efficient transfer of the description of the object between systems. Additionally, the identifier may be used to enable predicting when or where a handoff may need to occur.

One of the key elements of the system is the fusion of spectral information derived from visible, infrared, ultraviolet, and hyperspectral imagers with spatial characteristics derived from more traditional image processing techniques to define an object uniquely. The remote sensing system must use hyperspectral video or a hybrid imaging system capable of capturing a timely sequence of images containing both spatial and spectral imagery to allow for a continuous correlation of spatial and spectral information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An object referencing method, comprising:
   acquiring, from a first image capture device having a first perspective, a first set of images including spectral image data and spatial image data;
   acquiring, from a second image capture device having a second perspective, a second set of images including spectral image data and spatial image data;
   identifying, based at least in part on the spatial image data, a first set of spatial portions, of an object, based on the first perspective and a second set of spatial portions, of the object, based on the second perspective;
   associating, based at least in part on the spectral image data, spectral signatures with spatial portions included in the first and second sets of spatial portions; and
   generating a profile for the object including the first set and second sets spatial portions and associated spectral signatures.

2. The method of claim 1, wherein the identifying the first set of spatial portions, includes determining a relative motion parameter between the object and the first image capture device.

3. The method of claim 1, wherein the identifying the first set of spatial portions, includes determining an object orientation in the subset of the first set of images.

4. The method of claim 1, wherein the generating the profile, includes generating a multi-dimensional spectral reflectance profile.

5. The method of claim 1, wherein the acquiring the first set of images, includes acquiring hyperspectral video.

6. The method of claim 1, wherein the acquiring the first set of images, includes acquiring at least one of a multispectral or hyperspectral datacube.

7. The method of claim 1, further comprising classifying the object based at least in part on the profile.

8. The method of claim 1, wherein the generating the profile includes associating, for the object, at least one of a set of spatial dimensions or a set of spectral textures with the profile.

\* \* \* \* \*